United States Patent Office 3,360,640
Patented Dec. 26, 1967

3,360,640
SURGICAL ILLUMINATING APPARATUS
Ernst-Otto Seitz, Hanau, Volker Schaefer, Bruchkobel, near Hanau, and Juergen Schaefer, Niedermittlau, Kreis Gelnhausen, Germany, assignors to Quarzlampen Gesellschaft m.b.H., Hanau am Main, Germany
Filed Apr. 5, 1965, Ser. No. 445,530
Claims priority, application Germany, Apr. 11, 1964, Q 783
6 Claims. (Cl. 240—1.4)

ABSTRACT OF THE DISCLOSURE

A surgical cold light illuminating apparatus employing a source of light, and a fiberglass light conducting bundle connected with one end to the source of light and with its other end to a reflector suspended beneath it which it is simultaneously supporting. Optionally the source of light includes a camera flash bulb system. The fiberglass bundle may include a retractable reel-mechanism to adjust the reflector spacing from the illuminated area. The light source, because of the use of the fiberglass bundle, may be in addition heat insulated from the area to be illuminated.

BACKGROUND OF THE INVENTION

Field of the invention

The present invention is directed to an illuminating apparatus for surgical and similar purposes. The body of the lights or lamps of the conventional multi-eyed surgical lights, movably suspended over the operating area is maintained therein.

Summary of the invention

The primary object of the present invention is to provide a surgical illuminating apparatus having a lamp body movably suspended over the operating area with several spaced light outlets with at least one common source provided for all outlets in a separated explosion-proof housing, the light source and the outlets having one or more flexible light conduits.

Another object of the invention is to provide a surgical illuminating apparatus of the type disclosed wherein the one conductor or at least some of them, if a plurality of them is employed, comprises thin glass fibers in bundles terminating in the illuminating apparatus with converging lenses representing the light outlets.

Still another object of the invention is to mount the ends of the fiber glass bundles adjustably with respect to the converging lenses.

Another object of the invention is to eliminate the disturbing heat of the conventional surgical illuminating apparatus during operation.

Yet another object of the invention is to provide the apparatus of the type mentioned with a camera combination.

Brief description of the drawings

Other objects and many of the attendant advantages of this invention will become apparent to those skilled in the art from the following description and accompanying drawings in which.

Like reference characters define the same or similar parts throughout the specification and drawings.

Description of the preferred embodiments

Figure 1:
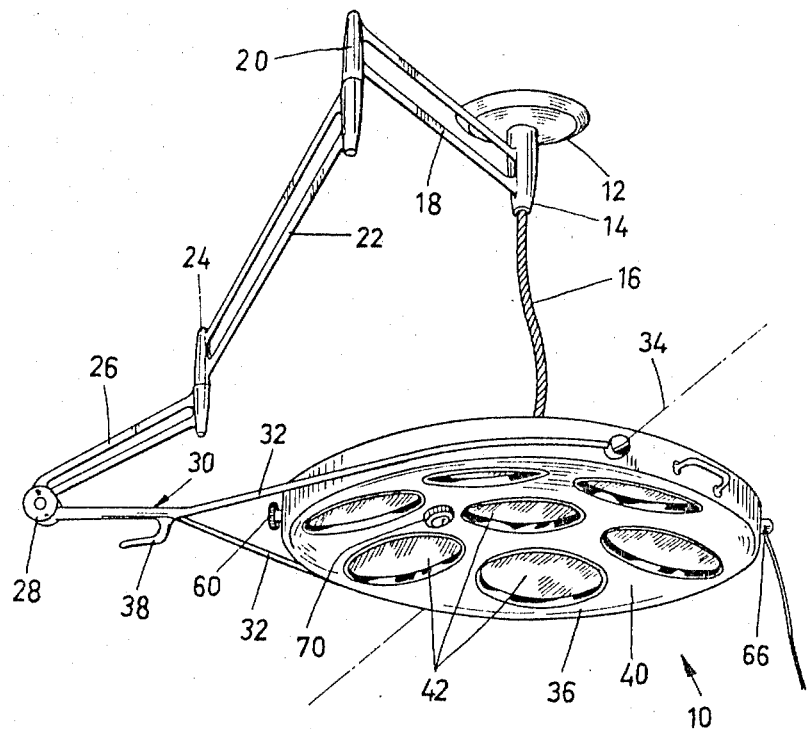
FIG. 1 is a perspective view of a surgical illuminating apparatus in accordance with the present invention in vertical suspension.

The surgical illuminating lights have a simple construction, good protection from dust and versatile applicability due to several light-emissive outlets positioned in the body of the light or lamp at a distance from each other. Additionally, freedom from shadows and stereoscopic vision are assured in the illuminated area or region.

The present invention overcomes the disadvantages of the conventional surgical lamps or lights.

The conventional light body or body of the light unit contains all the elements necessary for the conversion of electrical energy into light. A single floodlight with incandescent lamp, or light bulb, heat-insulating filters, reflectors, and a corresponding suspension thereof is provided behind each light outlet. For this reason, the body of the light apparatus is heavy, large in diameter thereof and produces heat which radiates on the surgeon. The heavy light body made with a stable rigid suspension formed by hinged or articulated brackets is hard to manipulate. The heat which is formed by the lamp may bring on the danger of an explosion of the anesthetic gases.

In order to eliminate the disadvantages of the prior art, the surgical illuminating apparatus in accordance with the present invention is so designed and arranged that at least one light source common to all of the light-emissive outlets is present and is accommodated in an explosion-proof housing which is separated from the body of the illuminating apparatus and connected with light-emissive outlets by way of at least one flexible light conductor.

Advantageously, the conversion of the electrical energy into light no longer takes place in the body of the illuminating apparatus. Therefore, the inevitable formation of heat at the light source has no disturbing effects on either the patient or the surgeon, nor can it produce the danger of an explosion of anesthetic gases since the separate lamp housing may be better sealed off than the housing of the illuminating apparatus. The present invention renders it possible to employ as the light source particularly strong high-powered incandescent lamps or other type discharge lamps which, despite their excellent light yield could not be used heretofore in the illumination of operating rooms because of the excessive formation of heat. The body of the illuminating apparatus may be made light whereby the suspension requirements are relieved. No large forces are needed for the adjusting movements. The housing of the illuminating apparatus may be kept small also in the overall dimensions thereof. This reduces or eliminates the psychological stresses on the surgeon who usually felt oppressed heretofore by the large light body hanging directly over the operating area. While the illuminating apparatus itself is kept completely maintenance-free, any inspection work on the housing, or exchange of lamps, may be carried out in a simple manner because the housing is separated from the body of the illuminating apparatus.

In the prior art a flexible light conductor described here as a connection between the lamp housing and the body of the illuminating apparatus has not been employed for illumination purposes.

The recognition and solution of the existing problems as to a large and shadow-free working of surgical lamps would permit stereoscopic vision by the consistent use of a flexible light-conveying means.

The flexible light-conveying means of the present invention utilize advantageously thin fiber glass bundles which terminate in the surgical illuminating apparatus in each case in the focal point of converging lenses representing the light-emissive outlets. The fiber glass bundle ends are almost ideal pin point light sources with a predetermined direction of reflection and are directed toward the respective converging lenses. The conventionally required reflectors become superfluous and the light ray emitted by the converging lenses is bundled in parallel. Moreover, there is no need for the provision of any heat-protective or heat-insulating means in the body of the illuminating apparatus since the filtration of the heat takes place advantageously in the lamp housing. The ends of the fiber glass bundles in the housing of the surgical illuminating apparatus may be provided adjustably with respect to the converging lenses so that the extent or range of the area to be illuminated may be varied in a simple manner.

One fiber glass bundle in the surgical illuminating apparatus may be branched off from the flexible light-conductor and passed to the wall of the illuminating apparatus where it ends as a light socket. Additional lamps, illuminated or luminous instruments or endoscopes may be connected to this light socket with the aid of a further light-conveying means and may also be supplied in this manner from the light source of the surgical illuminating apparatus. A neuro surgeon may connect, for example, a cap lamp operated with a flexible light-conveying means to a light socket provided in this manner. Several light sockets may, of course, be provided without difficulties for simultaneously connecting several apparatus or instruments.

An improved utilization of the new surgical illuminating apparatus is effected by connecting with the flexible light conductor a flexible image conductor or image-conveying means which extends from an objective positioned in the surgical illuminating apparatus in the direction of reflection to a camera which is disposed in or at the separate lamp housing. The camera may be a photographic camera, a movie camera or a television scanner such as an iconoscope system. The demands for the connection of surgical illuminating apparatus to such cameras are constantly increasing. The installation or reconstruction of such scanners produced difficulties heretofore. In the multi-eyed operating light systems one of the floodlights had to be sacrificed generally to provide space for the installation of a camera. Particularly expensive is the light combination with a frequently desired color television camera. With the aid of the present invention this requirement may be satisfied easily and at any time because it removes the obstacles thereto, which were inherent to the light sources of the prior art. The cause for the heretofore prevailing difficulties of installation, i.e. the dimensions of the camera and the sensitivity toward heat, may be readily controlled because of the separation of the light source from the newly introduced light guide.

The separate lamp housing may be accommodated either within or outside of the operating room. When accommodating it within the operating room the installation will expediently be chosen in proximity to the attachment at the ceiling, and when arranging it above the operating room, the place selected will be directly above the attachment of the illuminating apparatus.

In one embodiment the flexible light conductor extends into the lamp housing and the free portion thereof between the lamp housing and the body of the illuminating body is kept tight by way of a spring-loaded winding device.

One light source or, for safety reasons, several light sources are provided within the lamp housing at the end of the light conductor. In addition to the illuminating light, a photo flash may be transmitted advantageously from a flashlight positioned in the light source housing to the operating area by way of the light conductor. A modified embodiment of the present invention uses the principle of the invention in an illuminatig apparatus which has a elongated form of the reflector housing corresponding to the shape, dimensions and spatial extension of the operating table. Several illuminated areas may be produced simultaneously, in this instance, in that the converging lenses and the respective fiber glass bundle ends form, in each case, units suspended on gimbals and adjustable either jointly or individually.

Figure 3:
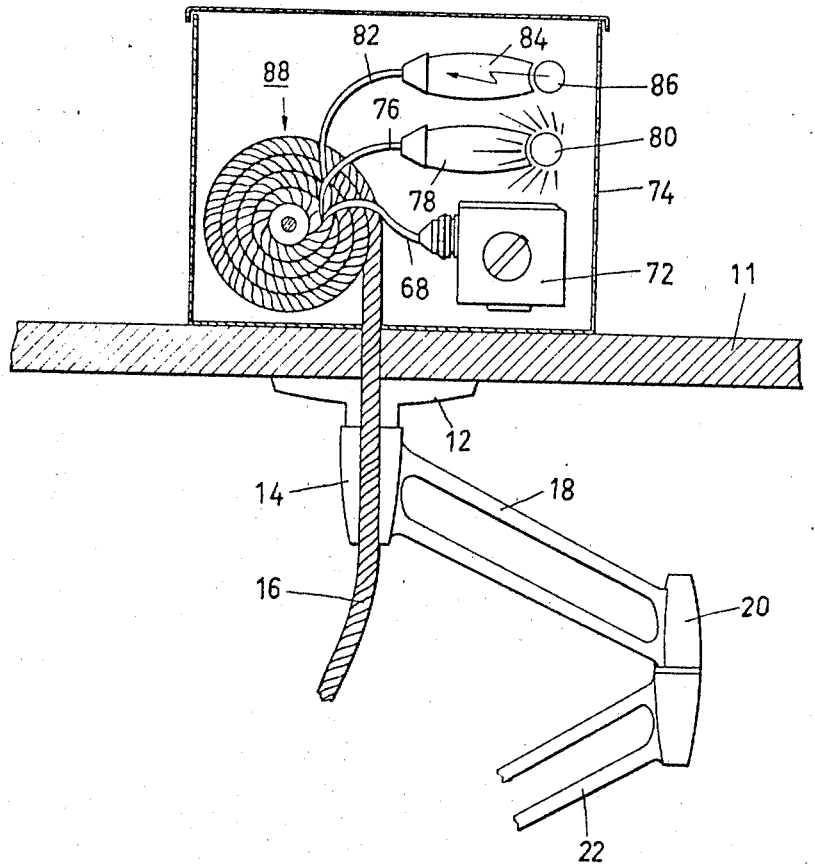
FIG. 3 is a schematic cross-sectional view of the arrangement of a light-source housing mounted on top of a division wall such as a ceiling of an operating room, connected to the reflector housing such as shown in FIG. 1, with parts broken off, vertically suspended from a ceiling.

Referring now to FIG. 1, a surgical illuminating apparatus 10 is shown, suspended from a ceiling 11, utilizing articulated brackets according to conventional principles. Directly on the ceiling is mounted a ceiling attachment for the illuminating apparatus which is closed off by a cover plate 12. Arranged below the cover plate 12 is a first swivel link or joint 14 having a vertical axis of rotation. The swivel link or joint 14 is hollow and thus allows for a passage for a flexible light conductor 16 which extends from a light source in housing 13 positioned outside of the operating room above the ceiling, as shown in FIG. 3, to the illuminating apparatus 10. The light conductor 16 consists of a cable made up from glass fibers or bundles thereof.

The glass fibers are preferably of very fine diameter and carefully bundled in alignment for best output. They are made either flexible or inflexible in structure and as such produce flexible or inflexible bundles in alignment. These bundles may be made also partly flexible and partly inflexible, for instance in the embodiment of FIG. 2; the lower portion of the bundles 16 may be made inflexible and may simultaneously serve as the sole support for the light reflector housing or optionally only the lowest portion thereof may be made flexible in order to permit a steering control of the reflector housing. The light guide 8 of FIG. 3 must be flexible at least for the length of the portion 88 which is to be coiled, and the end portion 16 of the light guide may be made flexible or inflexible as preferred. They are made preferably of glass or plastics, such as acrylates, methacrylates and others selected with the desired flexibility properties and with optimum light transparency and are preferably enclosed in a transparent envelope with the ends fused or potted and polished for optimum transparency. Each glass fiber is coated with a transparent material having a lower index of refraction than the materials of the fibers to aid the light to travel therethrough in a series of internal reflections from wall to wall. The bundle functions as a light guide, conduit, or conductor.

Figure 2:
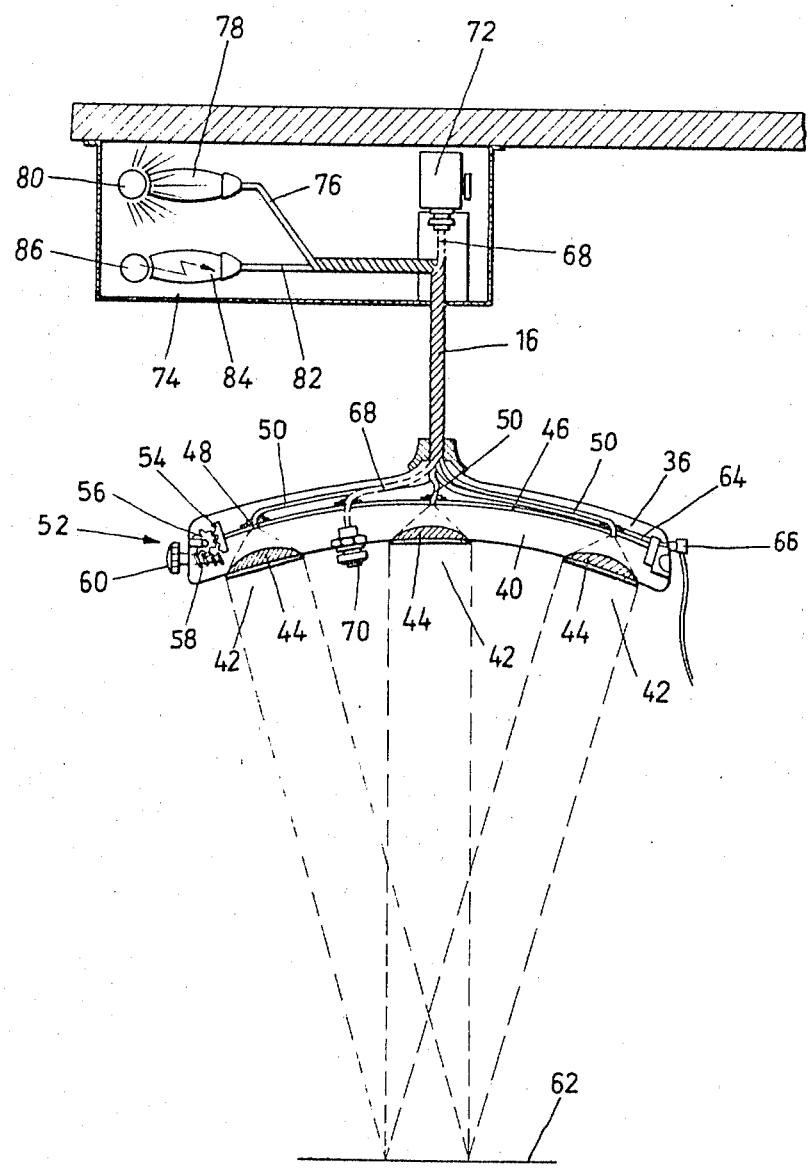
FIG. 2 is a view partly diagrammatical and partly in cross section of an apparatus similar to that of FIG. 1 showing a housing comprising a plurality of light sources connected to a ceiling and a housing having a plurality of light-passing orifices suspended thereunder with a bundle of fiber glass light conduits connecting the light sources with the light-passing orifices.

While one common light guide is shown in FIG. 2 connecting a common light source to each light passing orifice by split fiber glass bundles, it is within the scope of this invention to provide a separate light source for each light passing orifice, each light source and light passing orifice respectively connected by an independent glass fiber bundle.

Where a plurality of light sources is provided each one connects to one light-passing orifice, respectively, by an independent glass fiber bundle, the bundles preferably coiled again as shown in the drawings.

Instead of coiling the fiber glass threads and the bundles, they may be woven into ropes or cables as is conventional in these particular arts of rope and cable manufacture.

While each individual glass fiber thread may be coated with the transparent material having a lower index of refraction, it lies within the scope of this invention to coat each bundle of coiled or woven fiber threads up to the point where they are joined into the common cables and then to coat the common rope or cable up to the point at which they branch off to a plurality of light-passing orifices, when again each bundle is coated separately.

In this manner better distribution of the light source is achieved.

With the swivel link 14 is connected a first arm 18, preferably oriented horizontally and carrying at its other end a pivot joint 20. Adjacent the joint 20 are shown two preferably inclined arms 22 and 26 which are connected with one another by a pivot joint 24. In the embodiment shown, both the pivot joints 20 and 24 and the swivel link 14 have vertical axes of rotation. A swivel link 28 having a horizontal axis of rotation is provided at the lower end of an arm 26. The joint 28 supports an arm 30 which is pivotable about the longitudinal axis thereof and which carries a fork 32. The reflector housing 36 of an illuminating apparatus 10 is pivotally suspended about a transverse fork axis 34. The afore-described suspension of the surgical illuminating apparatus is different from the known suspensions in that all of the parts of the suspension are made considerably lighter than those of the known surgical lights of the prior art. This is possible because the housing 36 of the illuminating apparatus 10 is kept small and light while simultaneously rendering a better technical performance when compared to the conventional surgical lights. The body of the illuminating apparatus is made either from a plastic material or from a light metal and structurally does not require special carrying capacity for the electrical aggregates, reflector bulbs, heat-protective filters and the like.

The housing 36 of the illuminating apparatus is pivotable about the transverse fork axis 34. In order to permit pivoting about this axis also during the operation without the necessity of reaching into the sterile area of the operation, a handle 38 is arranged at the arm 30 in the manner shown and with the aid thereof the housing 36 of the illuminating apparatus may be moved either manually, by a guide stick or by way of a cable (not shown) running through or along the arms of fork 32.

In the downward direction, the housing 36 of the illuminating apparatus ends in an approximately circular spherical shell segment 40. The radius of the spherical shell is so chosen that the center thereof will be positioned approximately in the plane of the operating table. Several light outlets 42 are embedded in the spherical shell 40. These outlets preferably are equipped with lenses. The number and arrangement of the light outlets 42 correspond to the arrangement and number of single or individual floodlights in the conventional operating or surgical lamps. For example, either four or six light outlets may be disposed at the edge and a further outlet may be provided in the center. Any other desired number or distribution, however, is possible. But as compared to conventional surgical lamps, the light outlets 42 need less space within the body 36 of the illuminating apparatus than the individual floodlights of conventional surgical lights. For example, floodlights provided with incandescent lamps are superfluous. Moreover, it is no longer necessary to provide heat-protective filters and complicated mountings for them as was conventional in the prior art.

As is shown in the cross-sectional representation of FIG. 2, the surgical illuminating apparatus according to the present invention does not carry in its housing any bulky elements. The light outlets 42 have one converging lens 44 each which may be pressed in a simple manner from conventional transparent plastics such as organic glass. As light source serve in this case the ends 48 of individual fiber bundles 50 which are enclosed in an intermediate bottom 46. The fiber bundles 50 extending to the individual light outlets 42 are combined above the housing 36 of the illuminating apparatus in the flexible light conductor 16.

The distance which is assumed by the intermediate bottom 46 with respect to the spherical shell surface 40 is adjustable and an adjusting mechanism 52 is provided to control the spacing. This adjusting mechanism comprises, for example, a toothed rack 54 positioned at right angle to the plane of the intermediate bottom 46. The toothed rack 54 is in meshing engagement with an intermediate pinion 56 which is moved by a worm gear 58 connected with a knob 60.

When the knob 60 is turned clockwise or anti-clockwise, the intermediate bottom 46 is displaced in either the upward or downward direction. This results in a change of the spacing of the ends 48 of the fiber bundles 50 with respect to the converging lenses 44.

The path of rays as it results from a predetermined normal position has been shown in dotted lines in FIG. 2. The light rays ducted from the fiber bundles 50 through the ends 48 are collected by the converging lens 44 and reflected on to the operating area 62 as parallelly-oriented light rays. If the distance of the intermediate bottom 46 to the spherical shell 40 is altered, the reflecting angle below the lenses 44 will be opened because the ends 48 of the fiber bundles 50 are no longer positioned in the focal point of the respective converging lenses 44. The reflected or radiated light will be slightly divergent and the area or region illuminated on the operating table will become somewhat larger and will have a lower light intensity.

A fiber bundle 64 additionally branched off from the flexible light conductor 16 extends to a "light socket" 66 which is positioned laterally at the housing 36 of the illuminating apparatus. The light socket 66 serves for the connection of additional light-passing orifices or light conduits which may be supplied by the light socket 66 by way of the parent light conductor 64. The light socket 66 is covered when not in use. Depending upon the respective requirements, it is possible, of course, to provide several light sockets to one reflector housing.

A further fiber glass bundle 68 in the housing 36 of the illuminating apparatus, as shown in dotted lines, serves for the transmission of an image from an image source such as a lens or scanner 70 to a receiver, such as an optical viewer, a camera or screen 72. The camera 72 may be a photographic camera, a movie camera or a television camera such as an iconoscope or a projection screen. A color television camera may, of course, also be connected to the fiber bundle 68.

The camera 72 is disposed in a closed or sealed housing 74 which, in the embodiment of FIG. 2, is suspended from the ceiling 11 in the light source housing. The box 74 is easily accessible and may be closed or sealed in an explosion-proof manner. In addition to the camera 72, the box 74 contains the light sources. The flexible light conductor 16 is introduced into the box 74. The fiber bundles 50 and 64 which branch off from the common light conductor 16 are connected to a light transmitting device 78 by way of the light conductor 76, and the light-transmitting device 78 collects the total light of an incandescent lamp 80 and supplies it to the light conductor 76. The incandescent lamp 80 may be either a high-power light bulb or a quartz iodine lamp. The resultant heat is exhausted or dissipated from the box 74 by a fan (not shown) or in any other suitable manner. If the source of radiation 80 itself is not equipped with several filaments for emergencies or as a stand-by means, the light conductor 76 is connected, by way of a further light conductor 78, with another alternative source of radiation 80 (not shown) so that, in case of a breakdown of one light source 80, it is possible to automatically switch over to a stand-by reserve light source.

The fiber bundles 50 are additionally connected to a flashlight 86 by way of a light conductor 82 and a light-introducing device, such as a flashlight actuator 84, and the flash of the flashlight 86 is guided into the operating area 62 by way of the flexible light conductor and the fiber bundles 50 if additional illumination for photographic purposes is required.

In all instances where the structural possibilities permit, the box 74 will be arranged in a separate and readily accessible room above the ceiling 11 as shown in FIG. 3.

In that case, there is no need to provide for additional precautions to avoid the danger of an explosion of anesthetic gases since the box 74 may be completely sealed off against the operating room. The box 74 is readily accessible in the separate room and the resultant heat may be drawn off easily by suitable means.

FIG. 3 also illustrates another embodiment of the novel surgical illuminating apparatus. This figure depicts how the flexible light conductor or light conveying means 16 is guided over a self-winding winch or reel 88, which is spring loaded for return winding in a manner not shown and which assures that the flexible light conductor is tightly stretched at all times between the joint 14 and the housing 36 of the illuminating apparatus. The length of the light conductor depends upon the greatest possible distance which the housing 36 of the illuminating apparatus may need with respect to the swivel link or joint 14.

Figure 4:
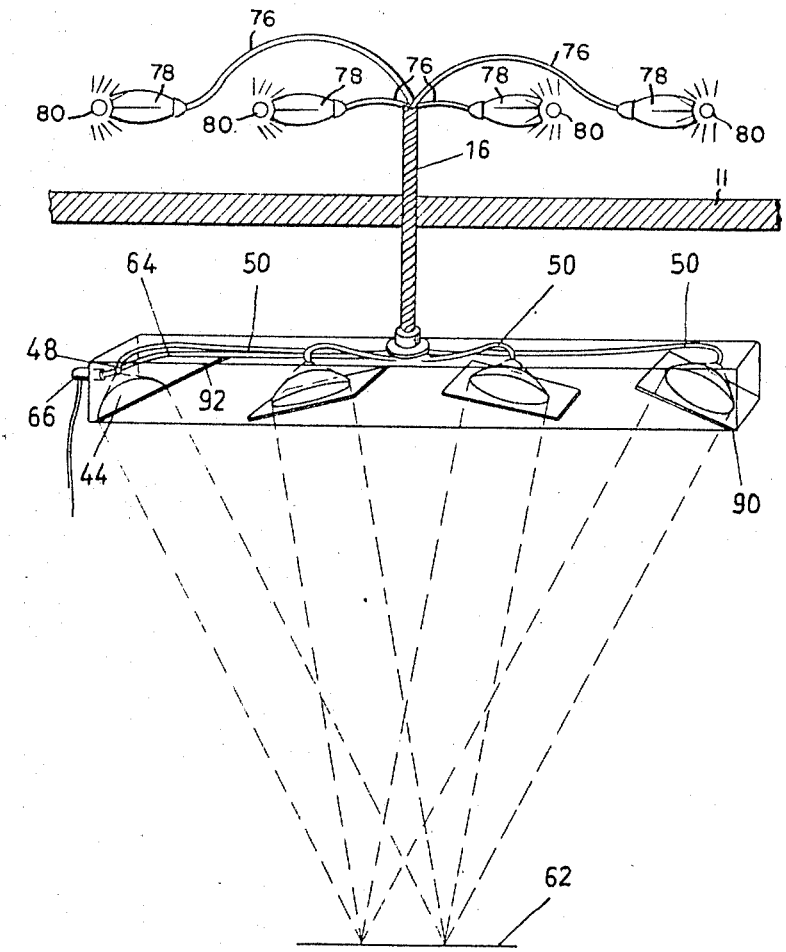
FIG. 4 is a schematic illustration of a modified embodiment of a reflector housing such as shown in FIG. 1.

FIG. 4 illustrates a modified reflector housing 90 to that of the circular housing 36 of FIGS. 1 and 2 of the illuminating apparatus of the present invention. The elongated housing 90 of the illuminating apparatus is oriented in the longitudinal direction thereof above the operating table and parallel thereto. The suspension may be effected in the same manner as shown in FIGS. 1 to 3 or in any other manner desired. Converging lenses 44 are enclosed within plane surfaces 92, preferably suspended on gimbals and supporting the ends 48 of the fiber bundles 50 in a suitable manner and at the proper distance. The gimbal suspension or mounting of the panes 92 permits adjusting of each individual converging lens 44 in an appropriate manner. For example, lenses may be adjusted jointly by means of a common adjusting mechanism (such as described for example in the German Patent 1,137,703). Additionally, it is also possible to provide an adjusting mechanism with the aid of which all plates 92 may be adjusted or regulated individually so that, for example, several operating regions on the operating area 62 may be illuminated simultaneously.

It should be understood that it is not intended to limit the invention to the above described forms, embodiments and details, and that the invention includes such other forms and modifications as are embraced by the scope of the appended claims.

We claim:

1. A surgical cold light system for uses such as in an operating room comprising a light source housing with at least one light source therein, a reflector housing with at least one lens supported therein, said reflector housing mounted from the ceiling, said light source housing mounted adjacent the ceiling insulated from said reflector housing, and at least one light conducting fiber cable having one end supported adjacent the light source and the other end supported adjacent the lens, said housing having means for raising and lowering said light source.

2. A device as defined in claim 1, said means for raising and lowering said light source comprising a retractable reel mechanism interposed between said light source and said reflector housing, a portion of said fiber-cable wound on said reel to permit alteration of the spacing of said reflector housing from the said light source housing, wherein the light source housing and the reel are mounted adjacent the operating room and separated therefrom by a wall of said light source housing, said reflector housing mounted to shed light upon the area of operation.

3. A device as defined in claim 1, said light source housing comprising a plurality of light sources, and a flash light mounted in said light source housing, said cable comprising a fiber bundle for each lamp and a fiber bundle for said flash light having one end of each bundle mounted adjacent each lamp and said flash light, respectively, and camera means mounted in said light source housing for photo-exposure of the area of operation.

4. A surgical light for use in an operating room comprising a light source, a reflector housing, means supporting a plurality of lenses in said housing, an objective lens supported in the housing, a camera supported at a point remote from the housing, a light conducting fiber bundle individual to each lens having one end supported adjacent the light source and the other end adjacent the lens, a light conducting fiber bundle connected to the objective lens and camera, whereby the operating scene is lighted by the light conductor from the source through the light conducting fiber bundles and through the lenses and the light from the operating scene is conducted through the object lens and a light conducting fiber bundle to the camera.

5. A surgical light for use in an operating room comprising a light source mounted above the ceiling and insulated from said operating room, a plurality of lenses supported in a lens-housing, and a light conductor comprising a plurality of fiber bundles, one individual to each lens having one end thereof supported adjacent the light source and the other end supported adjacent one of said lenses, said bundles being wound between the light source and lenses to form the light conductor as a cable, a winding reel mounted adjacent the light source with said cable wound on the reel said cable supporting said lens-housing below the ceiling.

6. A surgical lamp comprising a light source housing, means mounting said housing adjacent an operating room, an incandescent lamp, a flash lamp, a camera, and a winding reel supported in said housing, a support, means mounting a plurality of converging lenses, an objective lens, and light outlets on said support, said lenses mounted in the light outlets, a light conducting fiber bundle supported in the outlet at one end thereof and adjacent the incandescent lamp at the other end, and a light conducting fiber bundle connected to the object lens and camera, all said bundles being wound on each other intermediate their ends to form a cable, and said cable being wound on the winding reel whereby the support may be raised and lowered while maintaining the light source connected to the lenses, a picture of the operating scene may be made, and light piped from the outlet to a selected target.

References Cited

UNITED STATES PATENTS

| | | | |
|---|---|---|---|
| 1,286,590 | 12/1918 | Grether | 240—11.2 |
| 2,227,861 | 1/1941 | Petrone | 240—1 |
| 2,802,932 | 8/1957 | Lambert | 240—8.18 |
| 3,010,013 | 11/1961 | Gunther et al. | 240—1.4 |
| 3,016,785 | 1/1962 | Kapany | 240—1 |
| 3,278,738 | 10/1966 | Clark | 240—1 |

FOREIGN PATENTS

| | | |
|---|---|---|
| 375,943 | 7/1932 | Great Britain. |
| 964,567 | 7/1964 | Great Britain. |

NORTON ANSHER, *Primary Examiner.*

D. L. JACOBSON, *Assistant Examiner.*